June 16, 1936.    B. BRUNEAU    2,043,982
VALVE FOR GAS TORCHES
Filed Sept. 3, 1935

INVENTOR.
BY *Beecher Bruneau*
ATTORNEYS.

Patented June 16, 1936

2,043,982

UNITED STATES PATENT OFFICE 2,043,982

VALVE FOR GAS TORCHES

Beecher Bruneau, Detroit, Mich.

Application September 3, 1935, Serial No. 38,969

3 Claims. (Cl. 251—76)

This invention relates to gas torches and in particular it relates to valve mechanism for controlling the flow of fluid with which the torch operates, and to means co-operable with the valve mechanism for maintaining a gas flame throughout the functioning range of the valve mechanism. More particularly the invention relates to means associated with a gas torch for the purpose of maintaining as operating flame only during such time as the torch is in actual operation.

It is therefore an object of my invention to provide a gas torch which will function efficiently in maintaining either an operating flame or a pilot light.

Another object is to permit a quick change from a pilot light flame to an operating flame without danger of "blowing out" the flame.

A further object is the attainment of economy in fuel.

These and other objects and advantages will appear more fully in the following detailed description.

Ordinarily the conventional gas torch consists of a fitting adapted for bringing together and mixing two different gases and including hand operated valves for regulating the flow of each gas. In brazing and soldering with the torch, accurate adjustment of the valves is required in order to produce a flame best suitable for the work operated upon. Therefore, once the valves are properly positioned the operator is reluctant to readjust the valves during the frequent stops in the brazing or soldering operation. Consequently, at the beginning of the operation, the flame is adjusted to proper intensity and continues with such intensity throughout the operation. In ordinary use the time in which the torch is burning intensely, far exceeds the time in which the flame is actually positioned in operative relation.

My invention contemplates an improvement in gas torches wherein the torch normally carries a flame in the form of a pilot light and wherein a continual manual pressure of a valve operating medium is required in order to change the pilot light into an operating flame. In this way the torch is operable only when in the manual grasp of an operator. A torch having the improvement of my invention has many obvious advantages. For example, the operator may easily and quickly and without moving the torch from its position relative to the brazing or soldering work, shut off the operating flame and observe the condition of the result. When the operation is stopped momentarily the intense flame may be reduced easily and quickly. The release of the manual grasp of the torch by the operator causes an automatic and immediate actuation of the controlling valves, thus changing the operating flame to a pilot light. This automatic feature permits the operator to lay the torch, while it is not in operation, readily on practically any surface without the danger hazard of the intense flame.

The torch of my invention is not particularly intended for autogenous welding or for cutting metals but is primarily intended for use in brazing or soldering, or the like, or for heating metal to a degree less than its melting point.

Torches of this type are used extensively in sheet metal work and in particular in the manufacture of automobile bodies in which the soldering of seams is an important item.

A preferred practical embodiment of my invention is illustrated in the accompanying drawing, in which.

Figure 1:
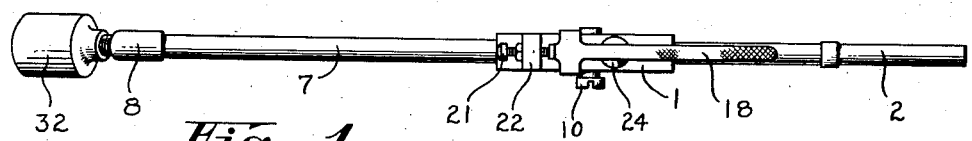
Fig. 1 is a plan view of a torch having the features of my invention.
Figure 2:
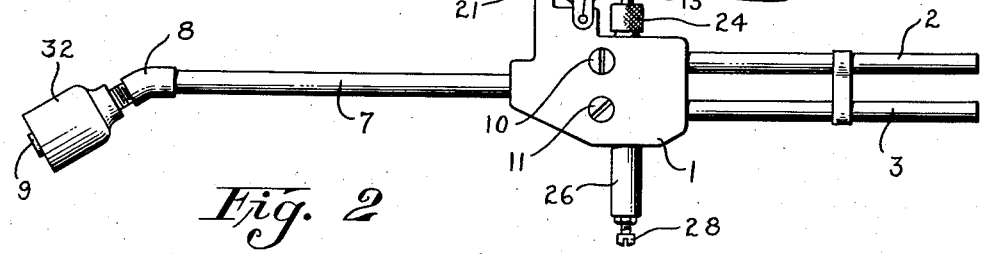
Fig. 2 is a side elevational view thereof.

Referring to the drawing the numeral 1 represents the body of a torch. Attached to the body 1 are fluid conduits 2 and 3 which in accordance with conventional practice are connected with flexible hose lines and thence to a source of fluid under pressure. Apertures 4 and 5 within the body 1 form a continuation of the apertures within the conduits 2 and 3 respectively. Within the body 1 the apertures 4 and 5 converge and communicate with a chamber 6 wherein the fluids moving through the apertures 4 and 5 mix and enter an extension conduit 7. Either a straight or an angular fitting such as an elbow 8 connects with the end of the extension conduit 7 and with a torch tip 9.

Associated with the body 1 are manually controllable valves 10 and 11 positioned in the paths of the apertures 4 and 5 respectively. As thus far described the illustrated embodiment includes those features of the conventional gas torch.

A vertical aperture 12 extends through the body 1 and transversely communicates with the apertures 4 and 5. Within this aperture 12 a pin 13 is retained in slidable relation. Reduced diameters 14 and 15 on the pin 13 are adaptable for registry with the apertures 4 and 5 respectively. Located on the pin 13 a short distance from the reduced diameters 14 and 15 are secondary reduced diameters 16 and 17 which are operable to communicate with the apertures 4 and 5, respectively, and to reduce the flow of fluid through the latter apertures.

Reciprocal actuation of the pin 13 is caused by a manual operating lever 18 positioned in contact engagement with the end of the pin 13 and pivoted to the body 1 at 19. At the pivotal end of the lever 18 is an upwardly extending portion 20 which co-operates with an adjustable stop screw 21 retained in a projection 22 forming part of the body 1. Thus the adjustable stop screw 21 limits the movement of the lever 18 and controls the upward adjustment of the pin 13 relative to the apertures 4 and 5.

A threaded extension 23 of the body 1 and in concentric alignment with the pin 13 permits the engagement of a packing nut 24 therewith. A packing 25 retained by the packing nut 24 prevents the escape of fluid from the aperture 4 or 5.

At the opposite end of the pin 13 and concentric therewith is a retaining cup 26 secured to the body 1 by threaded engagement. Within the cup 26 is a spring 27 which exerts a pressure against the pin 13 to retain the pin normally in an upward position. An adjustable stop screw 28 threaded through the end of the cup 26 is positioned for contact engagement with the end of the pin 13 and determines the lower limit of the downward movement of the pin 13.

Figure 3:
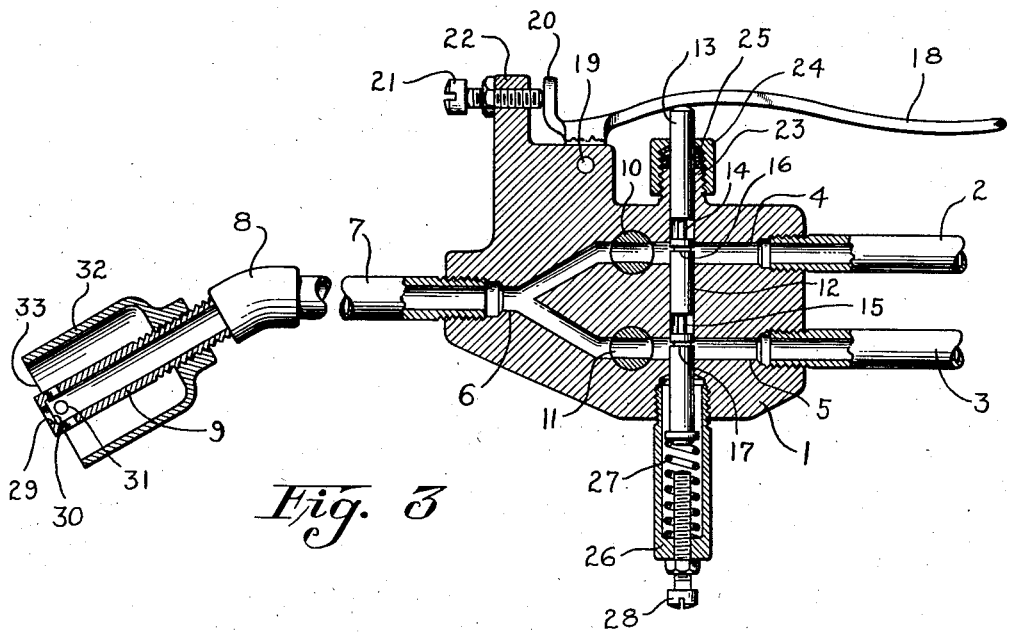
Fig. 3 is an enlarged side elevational view, partly in section, of my invention; and, Fig. 4 is a diagrammatic side view illustrating a gas flame in operation.

As shown in particular in Fig. 3 the torch tip 9 includes means for assisting in maintaining a flame throughout the working range of the valve mechanism. The means include a restricted aperture 29, at the end of the tip 9, forming a shoulder 30. Also, a plurality of apertures 31 spaced a short distance from the shoulder 30 extend transversely through the wall of the torch tip 9. Surrounding the tip 9 is a cup 32 attached to the tip opposite its open end by threaded engagement. The threaded engagement permits adjustment of the cup 32 along the tip 9 so that the open end 33 of the cup 32 may be positioned in proper functional relation with the apertures 29 and 31 of the tip 9.

My invention is particularly intended for productive operation which requires a flame of uniform intensity. Consequently, the main adjustable valves 10 and 11 which control the flow of gases are normally in a fixed position. In other words, once these valves are adjusted to effect a proper mixture of the gases and to result in a flame of desired intensity, further adjustment of the valves is unnecessary.

In the operation of the torch of my invention the conduit 2 is connected to a source of fluid pressure in the form of normal atmosphere under compression. This air is ordinarily supplied under a pressure up to 100 lbs. per sq. in. The lower conduit 3 is connected to a source of fluid pressure in the form of natural or artificial gas, acetylene, butane, calorene, carbohydrogen, city gas, hydrogen, pyrogen, producer gas, primogas or thermoline. The gas is usually supplied under a pressure of about ½ lb. per sq. in.

The air and inflammable gas enter the apertures 4 and 5, respectively, wherein the valve pin 13 restricts the passage thereof. In the free state of the torch, the valve pin 13 is normally positioned by means of the spring 27 in a manner so that the reduced diameters 16 and 17 of the pin 13 are in the paths of the apertures 4 and 5 respectively. These reduced diameters 16 and 17 are effective for permitting a sufficient flow of the fluids to maintain a pilot light.

After passing through the valves 10 and 11, the fluids enter the common chamber 6 wherein the fluids are mixed and thereafter pass through the conduit 7 and tip 9. As the fluids emerge from the tip 9 they may be ignited by any conventional means.

When it is desired to place the torch in service, after it is ignited, the operator grasps the torch in a manner so that the operator's hand engages with the lever 18 to depress same. This actuates the valve pin 13 to bring the reduced diameter 14 and 15 into the paths of the apertures 4 and 5 respectively. The quick release of the fluids permits same to flow through the aperture of the conduit 7 and through the tip 9. The onrushing fluids, in part, strike the shoulder 30 formed by the reduced tip aperture 29 and surge backward to escape through the transverse apertures 31. In this way the onrushing fluids will not operate to blow out the pilot light.

Figure 4:
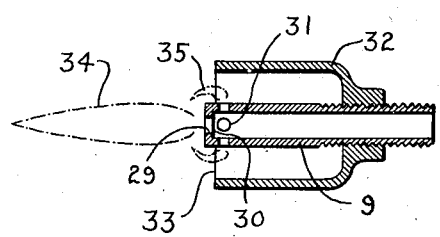

As shown in Fig. 4, a flame 34 is emitted from the nozzle tip 9. In addition secondary flames 35 are emitted from the transverse aperture 31. The cup 32 protects the secondary flames 35 from the influence of extraneous air currents, thus permitting the flames 35 to bend in uniform conformity towards the main flame 34. The presence of the secondary flames 35 at all times prevents the main flame from blowing out regardless of the quickness in which the fluids are initially permitted to pass to the torch tip 9.

In order to maintain a flame in accordance with the practice of my invention, it is essential to provide a correct relationship between the end of the tip 9, the transverse apertures 31 and the open end 33 of the cup 32. I find that good results are obtained by placing the transverse apertures 31 within $\tfrac{1}{16}$ of an inch from the end of the torch tip 9. Also, the end of the torch tip 9 should extend beyond the open end 33 of the cup 32, but the transverse apertures 31 should be within the open end 33 of the cup 32. The adjustability of the cup 32 relative to the tip 9 provides a variable feature for compensating for different size apertures and/or fluid pressures.

As thus shown and described it is obvious that a definite relation exists between the valve mechanism and the torch tip construction. The valve mechanism permits a rapid change from a pilot light to an operating flame or the reverse thereof while the torch tip construction functions to maintain a flame throughout the working range of the valve mechanism.

While I have shown and described a present preferred embodiment of my invention it is to be understood that other variations or modifications are contemplated within the scope of the invention except as limited by the appended claims.

Having thus described my invention what I claim is:

1. In a torch of the character described, a valve body having two inlet apertures and one outlet aperture, a valve pin slidable within the valve body and extending transversely of and in the path of the inlet apertures, said valve pin having a reduced diameter forming a small passageway normally adapted to lie in the path of each inlet aperture, and a second reduced diameter forming a larger passageway independent of and spaced from the small passageways adaptable to communicate with the path of each inlet aperture, and means for manually moving the pin to bring the larger passageways into the paths of the inlet apertures.

2. In a torch of the character described, a valve body having two inlet apertures and one outlet aperture, a valve pin slidable within the valve body and extending transversely of and in the path of the inlet apertures, said valve pin having a reduced diameter forming a small passageway normally adapted to lie in the path of each inlet aperture, and a second reduced diameter forming a larger passageway independent of and spaced from the smaller passageways and adapted to communicate with the path of each inlet aperture, and means for manually moving the pin to bring the larger passageways into the paths of the inlet apertures, said smaller passageways being positioned a distance from the larger passageways that the smaller passageways will move into the paths of the inlet apertures before the larger passageways move completely out of the paths of the inlet apertures.

3. In a torch of the character described, a valve body having two inlet apertures and one outlet aperture and having a bore extending through the valve body transversely of and communicating with the inlet apertures, a valve pin slidable within the bore, said valve pin having a relatively large and a relatively small circumferential recess adaptable for communicating with each of the inlet apertures, means for normally positioning the valve pin to maintain the small recesses in the paths of the inlet apertures, and manual means for moving the valve pin to position the large recesses in the paths of the inlet apertures, said recesses being located on the valve pin in a position to maintain at all times a passageway for the inlet apertures at least as large as provided by the small recesses.

BEECHER BRUNEAU.